United States Patent
Liu et al.

(10) Patent No.: US 6,579,206 B2
(45) Date of Patent: Jun. 17, 2003

(54) COORDINATED CONTROL FOR A POWERTRAIN WITH A CONTINUOUSLY VARIABLE TRANSMISSION

(75) Inventors: Sharon Liu, Ann Arbor, MI (US); Anna G. Stefanopoulou, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/916,236

(22) Filed: Jul. 26, 2001

(65) Prior Publication Data

US 2003/0022752 A1 Jan. 30, 2003

(51) Int. Cl.$^7$ .............................................. B60K 41/12
(52) U.S. Cl. ...................................................... 477/43
(58) Field of Search ............................................ 477/43

(56) References Cited

U.S. PATENT DOCUMENTS

| | | | | |
|---|---|---|---|---|
| 4,831,898 A | * | 5/1989 | Miyawaki ..................... | 477/43 |
| 4,872,115 A | * | 10/1989 | Itoh et al. ..................... | 477/43 |
| 5,046,177 A | * | 9/1991 | Vahabzadeh ................. | 477/43 |
| 5,047,937 A | * | 9/1991 | Vahabzadeh et al. ......... | 477/43 |
| 5,521,819 A | * | 5/1996 | Greenwood ................. | 477/434 |
| 5,540,632 A | * | 7/1996 | Lardy et al. .................. | 477/43 |
| 5,545,106 A | * | 8/1996 | Senger et al. ................ | 477/43 |
| 5,820,513 A | * | 10/1998 | Greenwood ................. | 477/43 |
| 5,846,157 A | | 12/1998 | Reinke et al. ................ | 477/48 |
| 5,997,431 A | | 12/1999 | Vukovich et al. ............. | 477/48 |
| 6,223,111 B1 | | 4/2001 | Cronin et al. ................ | 701/51 |

OTHER PUBLICATIONS

Fitz, Frank A. and Paul B. Pires, Epilogics, Inc. *A high torque, high efficiency CVT for electronic vehicles*, SAE Paper 910251.

Fitz, Frank A. and Paul B. Pires, Epilogics, Inc. *A geared infinitely variable transmission for automotive applications*, SAE Paper 910407.

Kemper, Yves and Lee Elfes, Vadatec Corp. *A continuously variable traction drive for heavy–duty agricultural and industrial applications*, SAE Paper 810948.

Smith, M.J., C.J. Greenwood, and G.B. Soar, *A full–toroidal traction drive CVT—from theory into practice*, International Mechanical Engineer, 1992, C389/066, 925061.

Hirano, Sadayuki, Alan L. Miller, and Karl F. Schneider, *SCVT—A state of the art electronically controlled continuously variable transmission*, SAE Paper 910410.

Vahabzadeh, Hamid, and Samuel M. Linzell, *Modeling, simulation, and control implementation for a split–torque, geared neutral, infinitely variable transmission*, SAE Paper 910409.

(List continued on next page.)

*Primary Examiner*—Dirk Wright
(74) *Attorney, Agent, or Firm*—Christopher DeVries (57) ABSTRACT

A method of controlling a vehicle is provided. The method includes controlling a continuously variable transmission and an engine with a supervisory controller and a powertrain controller; providing a driver input to the supervisory controller; controlling the supervisory controller to constrain the engine along a predetermined operating curve during a steady state condition of the driver input; and controlling the supervisory controller to relax the engine from the predetermined operating curve during a non-steady state condition of the driver input such that the powertrain controller coordinates an engine throttle and a rate of change of the continuously variable transmission ratio. Here, the predetermined operating curve is maintained by adjusting a continuously variable transmission ratio.

18 Claims, 2 Drawing Sheets

OTHER PUBLICATIONS

Funatsu, Koichi, Hideo Koyama, and Takashi Aoki, *Electronic control system of Honda for CVT*, International Conference On Continuously Variable Power Transmissions CVT 1996, Yokohama Proceedings, Sep. 11–12, 1996, (Conf. Pub. No. 107).

Yasuoka, Masayuki, Masaaki Uchida, Shusaku Katakura, and Takahiro Yoshino, *An integrated control algorithm for an SI engine and a CVT*, SAE Paper 1999–01–0752.

Deacon, M, C.J. Brace, M. Guebeli, N.D. Vaughan, C.R. Burrows, R.E. Burrows, R.E. Dorey, *A modular approach to the computer simulation of a passenger car powertrain incorporating a diesel engine and continuously variable transmission*, IEE International Conference on Control, 1994, London, UK vol. 1, No. 389.

Guzzella, Lino and Andreas Michael Schmid, *Feedback linearization of spark–ignition engines with continuously variable transmissions*, IEEE Transactions on Control Systems Technology, vol. 3, No. 1, Mar. 1995, pp. 54–60.

Schmid, Andreas, Philipp Dietrich, Simon Ginsburg, and Hans P Geering, *Controlling a CVT–equipped hybrid car*, SAE Paper 950492.

Gott, Philip G., *Changing Gears: The Development of the Automotive Transmission*, SAE, Inc. 1991.

Chan, C., D. Yang, T. Volz, D. Breitweiser, F.S. Jamzadeh, A Frank, and T. Omitsu, *System design and control considerations of automotive continuously variable transmissions*, SAE Paper 840048.

Engelsdorf, Kurt, Karl–Heinz Senger, Martin–Peter Bolz, *Electric CVT control for power train optimization*, International Conference on Continuously Variable Power Transmissions, CVT 1996, Yokohama Proceedings, Sep. 11–12, 1996, (Conf. Pub. No. 111).

Liebrand, Nort, *Future Potential for CVT Technology*, International Conference on Continuously Variable Power Transmissions, CVT 1996, Yokohama Proceedings, Sep. 11–12, 1996 (Conf. Pub. No. 105).

Smith, M.J. D.H. Ridmarsh, and P. Foss, *The development of high specific output engines for use with a two regime IVT*, Autotech 1993, NEC Birmingham UK C427/36/237.

Freudenberg, Jim, Rick Middleton, Anna Stefanopoulou, *A Survey of Inherent Design Limitations*, American Control Conference Workshop Tutorial 2000, Chicago, IL, Jun. 2000.

Stefanopoulou, A.G., K.R. Butts, J.A. Cook, J.S. Freudenberg and J.W. Grizzle, *Consequences of Modular Controller Development for Automotive Powertrains: A Case Study*, PROC 1995 Conference on Decision and Control, pp. 768–773.

Kim, Hyunsoo, Hanlim Song, Talchol Kim, and Jongjum Kim, *Metal Belt CVT and Engine Optimal Operation by PWM Electro–Hydraulic Control*, International Conference on Continuously Variable Power Transmissions CVT 1996, Yokohama Proceedings, Sep. 11–12, 1996 (Conf. Pub. No. 304).

Marcopoli, V., *Inherent limitations associated with the weapon pointing control problem for a tank elevation system*, Proceedings of the 2000 American Control Conference, Chicago, IL Jun. 2000.

Middleton, R.H., *Tradeoffs in linear control system design*, Automatica, vol. 27, No. 2, pp. 281–292, 1991.

Shafai, Esfandlar and Hans Geering, *Control issues in a fuel–optimal hybrid car*, 1996, IFAC 13$^{th}$ Triennial World Congress, San Francisco, USA Session 8b–07 4, pp. 231–236.

Serranrens, Alex, Bas Vroemen, *CVT Control, A Hierarchical Approach*, Proceedings of ASME AVEC 2000, Ann Arbor, MI USA No. 134.

Shen, Shuiwen, A.F.A. Serrarens, M. Steinbuch, F.E. Veldpaus, *Control of a Hybrid Driveline for Fuel Economy and Driveability*, Proceedings of ASME AVEC 2000, Ann Arbor, MI, USA, No. 66.

Sakaguchi, Shinichi, Eisuke Kimura, Kazuhisa Yamamoto, *Development of an Integrated Engine–CVT Control System*, 1999 Transmission and Driveline System Symposium International Congress & Exposition, Mar. 1999, Detroit, MI, USA.

Kolmanovsky, Ilya, Jing Sun, Leyi Wang *Coordinated Control of Lean Burn Gasoline Engines with Continuously Variable Transmissions*.

Chana, Howard E., Advanced Engineering Staff, General Motors Corp., *Performance of CVT Transmissions*, SAE Paper, 860637, presented at the International Congress and Exposition, Detroit, MI, Feb., 1986.

Main, J.J., Ford Motor Co., Ltd, *Ford ELTEC Integrated Powertrain Control* SAE Paper 860652.

Kemper, Y., J.L. Tevaarwerk, Vadetec Research Corp., *A New Approach to CVT Traction Drives in Automotive Applications*, SAE Paper 861351, presented at the Passenger Car Meeting and Exposition, Dearborn MI, Sep. 1986.

Sakai, Yasuhito, Fuji Heavy Industries, Ltd., *The "ECVT" Electro Continuously Variable Transmission*, SAE Paper 880481.

Fellows, Thomas G., Christopher J. Greenwood, Torotrak (Development) Ltd., *The Design and Development of an Experimental Traction Drive CVT for a 2.0 Litre FWD Passenger Car*, SAE Paper 910408.

Ginsburg, Simon, Esfandiar Shafal, Christian Wittmer, Hans P. Geering, Swiss Federal Institute of Technology, *Test Bench Results of a Torque Pedal Interpretation with a CVT–Equipped Power Train*, SAE Paper 970293.

\* cited by examiner

COORDINATED CONTROL FOR A POWERTRAIN WITH A CONTINUOUSLY VARIABLE TRANSMISSION

TECHNICAL FIELD

This invention relates to coordinated control for a powertrain with a continuously variable transmission. More particularly, this invention relates to coordinated control of a continuously variable transmission and an engine to provide improved acceleration and drivability.

BACKGROUND OF THE INVENTION

Powertrains that have an internal combustion engine coupled to a continuously or infinitely variable transmission are used to provide efficient drive systems. In continuously or infinitely variable transmissions (hereinafter "CVT"), the transmission ratio can be changed in a continuous manner from a maximum under drive ratio to a maximum over drive ratio. This permits the engine to be operated at either the best fuel consumption area or the best performance area. Engine speed can be maintained at a substantially constant level while the transmission ratio is varied to attain a desired vehicle speed as requested by an operator.

Many different CVT systems are in use. For example, one such CVT is a belt drive CVT. Belt drive CVTs use a flexible belt that runs against steel sheaves. The sheaves of the input and output pulleys are movable axially to adjust the radius at which the belt turns, and therefore adjust the transmission ratio. A hydraulic pressure distributed from a control valve often moves the sheaves. U.S. Pat. No. 5,997,431 to the assignee of this invention provides such a hydraulically-actuated CVT, the contents of which are incorporated herein by reference.

The primary benefit of CVT devices is to let the engine operate independently of any load. This flexibility, in principle, allows the optimization of fuel economy without degradation of acceleration performance. But, optimizing the myriad of operating conditions has been difficult in prior control systems (e.g., uncoordinated control systems and decentralized control systems) of CVT powertrains.

In use of a CVT powertrain, movement by the driver of an accelerator pedal provides an indication of an amount of acceleration or deceleration. A supervisory control module then determines the desired engine and vehicle operating conditions that correspond to the acceleration command. Subsequently, one or more high-level control inputs drive the CVT powertrain to achieve the desired engine and CVT operation, while low-level internal controllers independently regulate the engine and CVT system behavior.

SUMMARY OF THE INVENTION

A method of controlling a vehicle is provided. The method includes controlling a continuously variable transmission and an engine with a supervisory controller and a powertrain controller; providing a driver input to the supervisory controller; controlling the supervisory controller to constrain the engine along a predetermined operating curve during a steady state condition of the driver input; and controlling the supervisory controller to relax the engine from the predetermined operating curve during a non-steady state condition of the driver input such that the powertrain controller coordinates an engine throttle and a rate of change of the continuously variable transmission ratio. Here, the predetermined operating curve is maintained by adjusting a continuously variable transmission ratio.

A control system for controlling a continuously variable transmission and an engine is provided. The control system includes a driver input, a supervisory control module, cross coupling inputs, an engine controller, and a transmission controller. The driver input has a steady state condition and a non-steady state condition. The supervisory control module constrains the engine to a predetermined operating curve in response to the steady state condition of the driver input. Moreover, the supervisory control module relaxes the engine from the predetermined operating curve in response to the non-steady state condition of the driver input. The cross coupling inputs are indicative of at least a portion of the steady state condition or the non-steady state condition. The engine controller receives a desired wheel speed, an actual wheel speed, and the cross coupling inputs. In response, the engine controller provides a desired engine throttle to the engine. Similarly, the transmission controller receives a desired transmission ratio, an actual transmission ratio, and the cross coupling inputs. In response, the transmission controller provides a desired CVT ratio change rate to the continuously variable transmission. The engine and transmission controllers receive the cross coupling inputs simultaneously such that the desired engine throttle corresponds to the driver input and the desired CVT ratio change rate corresponds to the driver input.

A method of eliminating a non-minimum phase zero effect from a CVT ratio change rate input to a wheel speed output of a continuously variable transmission coupled to an engine is provided. The method includes constraining the engine to operate along a predetermined operating curve during a steady state condition; relaxing the engine from the predetermined operating curve during a non-steady state condition; and providing cross coupling inputs indicative of at least a portion of the non-steady state condition.

A control system for a vehicle is provided. The control system includes a powertrain and a supervisory control module. The powertrain has an engine, a continuously variable transmission, and a two-input, two-output control module. The supervisory control module constrains the engine to an optimal engine operating curve in response to a first driver input, but relaxes the engine from the optimal engine operating curve in response to a second driver input. The two-input, two-output control module has first and second cross coupling inputs being indicative of at least a portion of the second driver input. The two-input, two-output control module receives a desired wheel speed, a desired transmission ratio, an actual wheel speed, an actual transmission ratio from the vehicle, and the first and second cross coupling inputs. In response, the two-input, two-output control module provides a desired engine throttle to the engine and a desired CVT ratio change rate to the continuously variable transmission. Thus, the desired engine throttle corresponds to the second driver input and the desired CVT ratio change rate corresponds to the second driver input.

The above-described and other features and advantages of the present invention will be appreciated and understood by those skilled in the art from the following detailed description, drawings, and appended claims

BRIEF DESCRIPTION OF THE DRAWINGS

Other objects, features, advantages and details of the present invention appear, by way of example only, in they following detailed description of preferred embodiments of the invention, the detailed description referring to the drawings in which.

DESCRIPTION OF THE PREFERRED EMBODIMENT

It is assumed for all examples that the CVT powertrain directly connects the engine to the wheels, and that there is no slip across the powertrain such that the dynamics of the powertrain are derivable. Referring now to the Figures and in particular to FIG. 1, undesired tracking conditions in conventional control systems for a CVT powertrain are illustrated. One such conventional control system, also known as a single-input system, utilizes only the CVT ratio change rate to control wheel speed and dedicates the throttle actuator to maintaining engine operation at a predetermined operating curve, such as but not limited to the maximum steady-state fuel-efficient operating points, during all conditions. For example, such a single-input system is provided by Guzzella and Schmid in *IEEE Transactions on Control Systems Technology*, Vol. 3, No. 1, March 1995, entitled "Feedback Linearization of Spark-Ignition Engines with Continuously Variable Transmissions."

Figure 1:
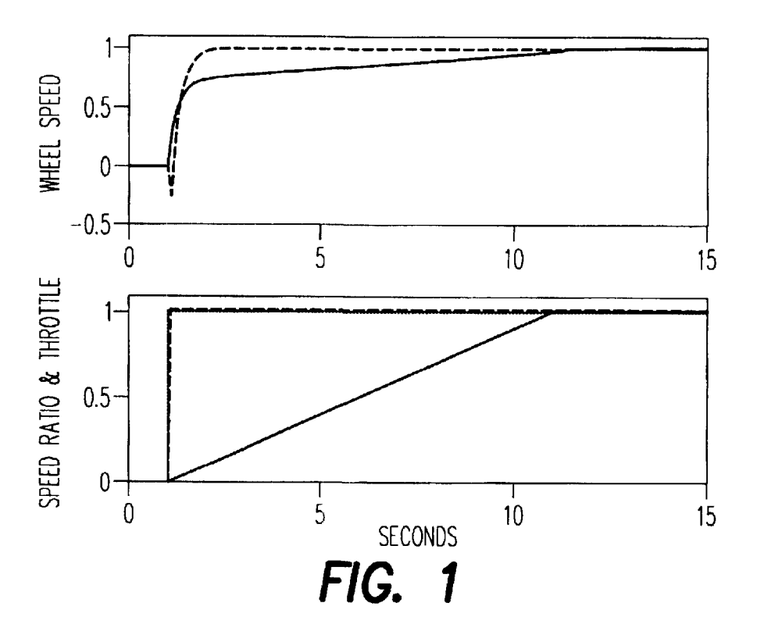
FIG. 1 is a graph illustrating prior control systems for CVT powertrains.

In FIG. 1, normalized wheel speed response in a single-input system over time due to an acceleration command from a driver is shown. By way of example, the response of a single-input system is illustrated with respect to an acceleration command commonly referred to as a "kick down" maneuver that requires both an engine torque increase and a CVT ratio increase to provide a fast acceleration. Here, the single-input system is initially operating with a 60% steady state driver pedal position, and is then increased to a 75% driver pedal position instantaneously at one second. The normalized CVT ratio and wheel speed response are plotted across 15 seconds.

The dotted line in the bottom graph represents the instantaneous engine throttle input corresponding to the "kick down" acceleration command. The dashed line in the bottom graph is the corresponding CVT ratio which results from the CVT ratio change rate input that is almost as fast as the engine throttle input. The CVT ratio input results in a wheel speed represented by the dashed line in the top graph. This wheel speed represents an undesired response, namely one that is initially inverted so that it decreases or undershoots. Thus, the CVT ratio input results in an initial wheel speed decrease even though the driver has initiated an acceleration command.

This is because the equation of motion for the wheel acceleration shows that the CVT ratio input opposes the throttle input. This characteristic is equivalent to a non-minimum phase (NMP) zero in the transfer function from the CVT ratio rate input to the wheel speed output when the system model is linearly approximated. First, NMP behavior is undesirable because the initial transient step response of a stable linear system with one real NMP zero starts in the wrong direction (e.g., has initial undershoot). Second, feedback cannot remove NMP zeros. And third, open-loop systems with NMP zeros have closed-loop bandwidth limitations and cannot be tuned to respond fast. As a result, if the single-input system constrains the engine to always maintain the predetermined operating conditions, such as maximizing fuel efficiency, the wheel speed responds poorly, especially during "kick down" maneuvers.

Figure 2:
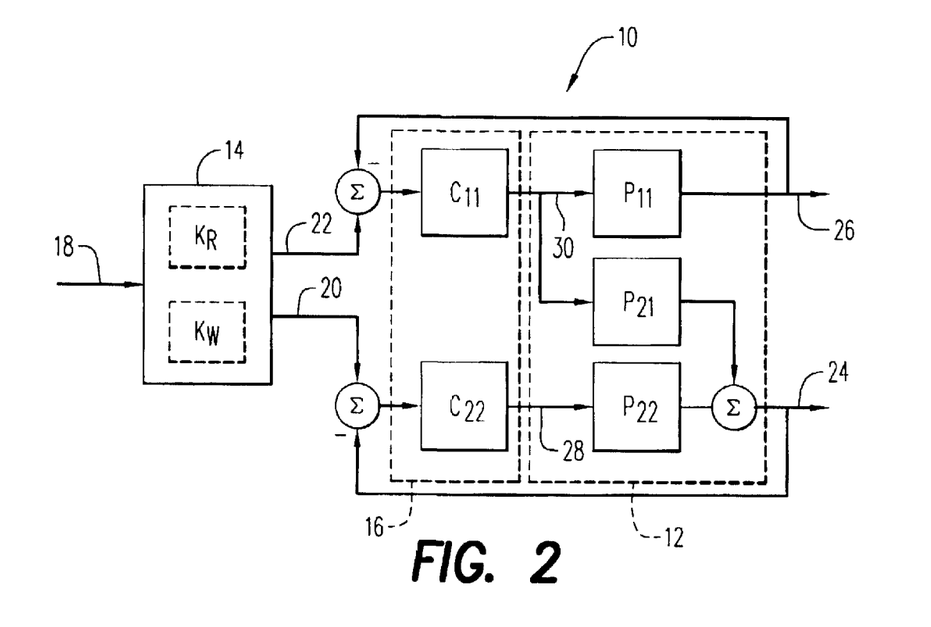
FIG. 2 is a schematic of a decentralized control system for a CVT powertrain.

Referring to FIG. 2, a different non-integrated control system 10, also known as a decentralized two-input, two-output (TITO) system, for a powertrain 12 is illustrated. Powertrain 12 includes an engine and a CVT. System 10 coordinates the control of powertrain 12 in a decentralized manner while a supervisory controller 14 constrains the engine to the predetermined operating curve at all times. Here, TITO system 10 alleviates the undesired wheel speed response illustrated in FIG. 1. However, TITO system 10 alleviates the undesired response by an undesired slowing of acceleration as described in detail below.

System 10 includes a powertrain control module 16 controlling powertrain 12. System 10 includes supervisory controller 14 adapted to provide a driver input 18 to a powertrain control module 16. Input 18 is a percent pedal position indicative of an acceleration or deceleration command. Supervisory controller 14 interprets input 18 as a desired wheel speed 20 and a desired CVT ratio 22, and provides the desired wheel speed and the desired CVT ratio to powertrain control module 16.

Next, powertrain control module 16 converts desired wheel speed 20 to an actual wheel speed 24, and converts desired CVT ratio 22 to an actual CVT ratio 26. Moreover, supervisory controller 14 constrains the engine to maintain the predetermined operative curve during steady state driver input and relaxes that constraint during non-steady state driver input. Thus, actual wheel speed 24 is defined by the equation (in the Laplace domain):

$$\{[(k_r P_{21} C_{11}) + k_w (P_{22} C_{22} + P_{11} C_{11} P_{22} C_{22})] + [(1+P_{11} C_{11})(1+P_{22} C_{22})]\} \text{Driver input}$$

Where $k_r$ and $k_w$ convert driver input 18 to desired CVT ratio 22 and desired wheel speed 20, respectively, in the supervisory controller 14, $C_{11}$ is a first control input and $C_{22}$ is a second control input, which cooperate to achieve closed-loop stability and output tracking, and where $P_{11}$, $P_{22}$, and $P_{21}$ are model components that quantify powertrain 12. More specifically, linear transfer functions $P_{11}$, $P_{22}$, and $P_{21}$ approximately quantify the CVT, the engine, and the CVT-engine interactive dynamics, respectively. The CVT-engine interactive dynamics $P_{21}$ is the transfer function from the CVT ratio change rate input to the wheel speed output that contains the NMP zero. Thus, powertrain control module 16 receives desired wheel speed 20 and actual wheel speed 24 as feedback to provide a desired engine throttle 28 to the engine of powertrain 12, and the powertrain control module 16 receives desired CVT ratio 22 and actual CVT ratio 26 as feedback to provide a desired CVT ratio change rate 30 to the CVT of the powertrain.

For minimum behavior, the initial value of the derivative of actual wheel speed 24 is positive during an increase in input 18 (e.g., an acceleration command). When the initial value theorem is applied to the Laplace transformed actual wheel speed defined by the equation above, the effect of control inputs $C_{11}$ and $C_{22}$ on the sign of the actual wheel acceleration is determined. In the Laplace domain, the initial wheel acceleration (e.g., $s \to \leq$: for $S^2$ Laplace transformed actual wheel speed) of the controlled powertrain is:

$$[(k_r P_{21} C_{11}) + k_w (P_{22} C_{22} + P_{11} C_{11} P_{22} C_{22})].$$

For stability and steady-state tracking reasons, control input $C_{11}$ has positive coefficients. It is thus not possible to change the sign of the component of the initial response at contributes to the inverse behavior (i.e., $k_r P_{21} \times C_{11}$) by manipulating the sign of the control input $C_{11}$. Consequently, the initial wheel speed response is dominated by the signal path from driver input 18 to actual wheels speed 24 with the smallest pole-zero excess, relative degree, or the fewest number of integrations. Due to its high relative degree, the final component (i.e., $P_{11} C_{11} P_{22} C_{22}$) does not contribute to the initial response. To compensate the inverse response due to the NMP zero in $P_{21}$, it is important to design a decentralized controller so that the relative degree of the upper path (e.g., through the NMP contributions) is larger than the relative degree of the lower signal path (e.g., through the $P_{22}$ contributions) to actual wheel speed 24, such as the relative degree of $P_{21} C_{11}$ and the relative degree of $P_{22} C_{22}$, which implies the relative degree of $C_{11} C_{22}+1$. However, this condition is satisfied only if control input $C_{11}$ contains at least one extra integration, or equivalent, such as but not limited to at least one lag (hereinafter "lag"). Thus, introducing a lag as control input $C_{11}$ eliminates the inverse response of the actual wheel speed 24, but slows down the response of the actual CVT ratio 26.

Referring again to FIG. 1, the solid line in the bottom graph is the CVT ratio which results from the CVT ratio change rate input that is slowed to compensate the engine throttle input. The solid line in the top graph illustrates the wheel speed response to the acceleration command as a result of the slowed CVT ratio rate input, namely, a wheel response that increases at slower than desired rate upon initiation of an acceleration command.

Accordingly and as described above, the single-input system, when constrained to maximum fuel efficiency, generates an initial wheel speed decrease even though the driver has initiated an acceleration command. Alternatively, decentralized TITO system 10, when constrained to maximum fuel efficiency by supervisory controller 14 during steady state driver input but relaxes that constraint during non-steady state driver input, generates an undesired slowing of acceleration.

Figure 3:
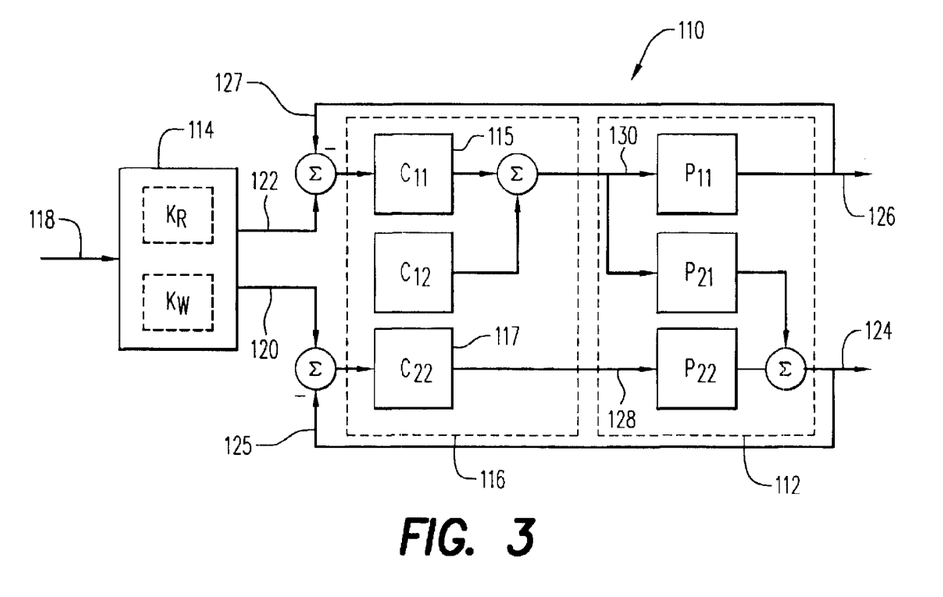
FIG. 3 is a schematic of an exemplary embodiment of an integrated and coordinated control system for a CVT powertrain.

It has been found that the above-mentioned drawbacks are resolved by the combination of relaxing the constraint of maximizing fuel efficiency during "kick down" maneuvers in TITO systems and providing cross-coupling control inputs. An exemplary embodiment of an integrated and coordinated control system or TITO system 110 for a CVT powertrain 112 is illustrated in FIG. 3. Powertrain 112 includes an engine and a CVT. Here, component parts performing similar or analogous functions to those referred to with respect to FIG. 2 are numbered by adding one hundred.

System 110 coordinates the control of a CVT powertrain 112 in an integrated manner, while a supervisory controller 114 eliminates the predetermined operative conditions constraint on a powertrain controller 116 during changes in a driver input 118. In doing so, system 110 alleviates both of the undesired responses illustrated in FIG. 1. More specifically, system 110 provides significant increases in drivability and acceleration performance of CVT powertrain 112, while decreasing fuel economy only during "kick down" maneuvers.

System 110 includes supervisory controller 114 adapted to provide driver input 118 to a powertrain control module 116. By way of example, driver input 118 is a percent pedal position indicative of an acceleration or deceleration command. System 110 interprets input 118 as a desired wheel speed 120 and a desired CVT ratio 122, and provides the desired wheel speed and the desired CVT ratio to powertrain control module 116.

Next, powertrain control module 116 converts desired wheel speed 120 to an actual wheel speed 124, and converts desired CVT ratio 122 to an actual CVT ratio 126. Moreover, supervisory controller 114 removes the constraint on the engine to maintain maximum fuel efficiency during changes in driver input. Here, actual wheel speed 124 is defined by the equation (in the Laplace domain):

$$\{[(P_{22}(,C_{11}+k_w C_{12})+P_{22}(k_r C_{21}+k_w C_{22}) \, k_w(P_{11} P_{22}) \, (C_{11} C_{22}-C_{12} C_{21})]4[1+(P_{11} C_{11})+(P_{21} C_{12})+(P_{22} C_{22})+(P_{11} C_{22})(C_{11} C_{22}-C_{12} C_{21})]\} \text{Driver input}$$

Where $k_r$ and $k_w$ convert driver input 118 to desired CVT ratio 122 and desired wheel speed 120, respectively, in supervisory controller 114, $C_{11}$ is a first control input, $C_{22}$ is a second control input, $C_{12}$ is a third or cross-coupling control input, and $C_{21}$ is a fourth or cross-coupling control input. Powertrain control module 116 thus provides a desired engine throttle 128 and a desired CVT ratio change rate 130 to powertrain 112. Here, powertrain 112 includes the linear transfer functions $P_{11}$, $P_{22}$, and $P_{21}$ that approximately quantify the CVT, the engine, and the CVT-engine interactive dynamics, respectively.

When the initial value theorem is applied to the Laplace transformed actual wheel speed 124 defined by the equation immediately above, the effect of control inputs $C_{11}$, $C_{22}$, $C_{21}$, and $C_{12}$ on the sign of the actual wheel acceleration is determined. In the Laplace domain, the initial wheel acceleration (e.g., $s \to \infty$ for $s^2$ Laplace transformed actual wheel speed) of the controlled powertrain is:

$$g_1((k_r C_{11})+(k_w C_{12}))$$

where $g_1$ is the N zero in the engine-CVT interactive dynamics in $P_{21}$. Here, $C_{21}$ plays no role and is therefore set to zero without loss of generality. However, and as other applications require, not setting $C_{21}$ to zero is considered within the scope of the present invention. Accordingly, it has been determined that the initial inverse response caused by the NMP zero, $g_1$, in $P_{21}$ is eliminated by choosing $C_{12}$ where: $(k_r C_{11}+C_{12}) \leq 0$ and where there is no constraint on $C_{22}$ or $C_{11}$ during non-steady state conditions of driver input 118.

Thus, system 110 does not present any limitation in achieving fast acceleration response or drivability by the combination of relaxing the constraint on the engine to maintain predetermined operating conditions during changes in driver input 118 and providing cross-coupling control input $C_{12}$ that enables system 110 to mitigate the limitations of the decentralized architecture. By way of example, cross-coupling control input $C_{12}$ is control information available to powertrain control module 116 relating to the future operating conditions of powertrain 112.

Cross-coupling control input $C_{12}$ provides information to desired CVT ratio change rate 130. Thus, cross-coupling control input $C_{12}$ enables powertrain control module 116 to know what desired CVT ratio change rate 130 is going to be sent from the control input $C_{11}$, at the initial time of an acceleration command input 118 to the powertrain control module, particularly through engine-CVT interactive dynamics $P_{12}$, that effects the actual wheel speed 124 in powertrain 112. System 110 is therefore able to cancel the deleterious effects of engine-CVT interactive dynamics on the initial wheel speed response by providing powertrain control module 116 with a compensating component to CVT ratio change rate 130. Namely, system 110 coordinates and integrates desired engine throttle 128 and desired CVT ratio change rate 130 to ensure the desired acceleration and drivability from CVT powertrain 112 during "kick down" maneuvers.

In a preferred embodiment, powertrain control module 116 includes an engine controller 117 and a CVT transmission controller 115. Here, engine controller 117 is adapted to receive desired wheel speed 120 from the supervisory controller 114 and is adapted to receive actual wheel speed 124 as feedback through loop 125. Similarly, CVT transmission controller 115 is adapted to receive desired CVT ratio 122 from supervisory controller 114 and is adapted to receive actual CVT ratio 124 as feedback through loop 127. Moreover, engine controller 117 is adapted to provide desired engine throttle 128 to powertrain 112, and CVT transmission controller 115 is adapted to provide desired CVT ratio change rate 130 to the powertrain. Cross-coupling controller input $C_{12}$ is provided to CVT transmission controller 115 and CVT transmission controller 117 in a substantially simultaneous manner. Here, cross coupling controller input $C_{12}$ includes information available to transmission controller 115 and relating to future operating conditions of the continuously variable transmission.

Figure 4:
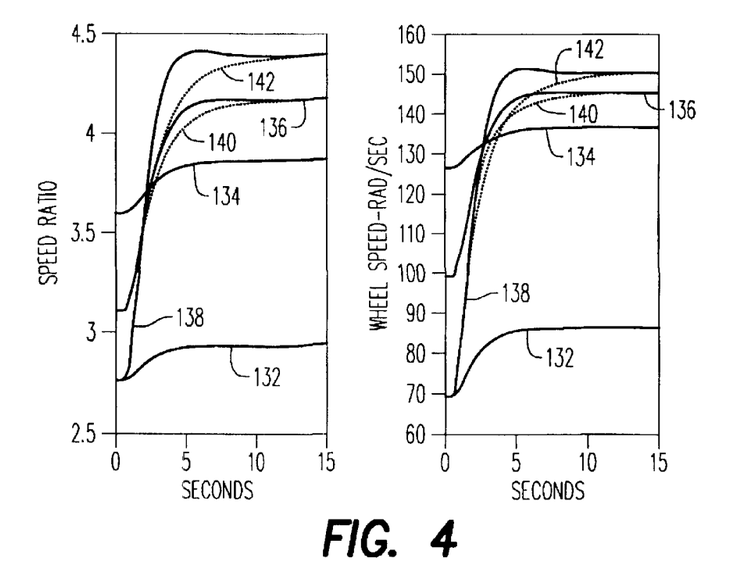
FIG. 4 is a graph illustrating the performance of the control system of FIG. 3.

The response of system 110 at four different acceleration commands (i.e., "kick down" maneuvers) is illustrated in FIG. 4. Here, outputs 126 and 124 are tracked for a total of 15 seconds, with an increase in the driver input 118 occurring at 0.5 seconds. The first example illustrates an increase in input 118 from a 10% pedal position to a 20% pedal position (i.e., a 10% increase) and is indicated by lines 132. The second example illustrates an increase in input 118 from a 60% pedal position to a 75% pedal position (i.e., a 15% increase) and is indicated by lines 134. Notably, the second example is comparable to the level of change of input 18 provided above with respect to prior control systems and illustrated in FIG. 1.

The third and forth examples represent larger percent increases in input 118 than provided by the first and second examples. Here, the third example illustrates an increase in input 118 from a 30% pedal position to a 90% pedal position (i.e., a 60% increase) and is indicated by lines 136. Similarly, the fourth example illustrates an increase in input 118 from a 10% pedal position to a 99% pedal position (i.e., an 89% increase) and is indicated by lines 138.

Lines 132, 134, 136 and 138, respectively, represent the linearized system approximation; however, non-linear system approximations are also illustrated. The non-linear system approximations for small increases in input 118 (e.g., lines 132 and 134) are identical to the linearized system approximations. However, the non-linear system approximations for larger increases in input 118 (e.g., lines 136 and 138) are not identical to the linearized system approximations. Here, the non-linear system approximation for line 136 is indicated by line 140, while the non-linear system approximation for line 138 is indicated by line 142. Thus, for large changes in input 118, the nonlinear system responses are slower than the linearized system responses.

However, none of the responses (i.e., lines 132, 134, 136, 138, 140 and 142) of system 110 generate an initial inverse in the wheel speed, or show slowing of the acceleration performance resulting from a ratio lag. Accordingly, system 110 provides improved acceleration and drivability response from the CVT powertrain at large and small increases in input 118 and in both linear and non-linear approximations, with a relaxation of the constraints on fuel efficiency only during such "kick down" maneuvers.

Of course, system 110 is described above by way of example as generating no initial inverse in the wheel speed, and shows no slowing of the acceleration performance resulting from a ratio lag with respect to several pedal position increases. Accordingly, it is considered within the scope of the present invention for system 110 to provide such improved acceleration and drivability response from the CVT powertrain across the entire range of pedal positions, namely pedal position changes between about 1% and 99%.

It should also be recognized that system 110 is described above by way of example as having supervisory controller 114, engine controller 117 and transmission controller 115 separate from one another. Of course, and as applications require, integrating some or all of controllers 114, 115, and 117 into a single controller is considered within the scope of the present invention.

Moreover, system 110 is adapted to function with existing CVT powertrains 112. Thus, system 110 is easily retrofitted on existing CVT powertrains 112 by replacing their existing control systems without a large replacement expense.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling a vehicle, comprising
controlling a continuously variable transmission and an engine with a supervisory controller and a powertrain controller;
providing a driver input to said supervisory controller;
controlling said supervisory controller to constrain said engine along a predetermined operating curve during a steady state condition of said driver input, said predetermined operating curve being maintained by adjusting a continuously variable transmission ratio; and
controlling said supervisory controller to relax said engine from said predetermined operating curve during a non-steady state condition of said driver input such that said powertrain controller coordinates a desired engine throttle and a rate of change of said continuously variable transmission ratio.

2. The method of claim 1, further comprising:
providing cross coupling terms to an engine control portion of said powertrain controller and to a transmission control portion of said powertrain controller in a substantially simultaneous manner, one of said cross coupling terms being information available to said transmission controller and relating to future operating conditions of said continuously variable transmission.

3. The method of claim 2, wherein said one of said cross coupling terms is a desired ratio change rate that corresponds to said non-steady state condition of said driver input.

4. The method of claim 1, wherein said powertrain controller is a two-input, two-output controller.

5. The method of claim 4, wherein said two-input, two-output controller includes an engine controller and a CVT transmission controller.

6. The method of claim 1, wherein said non-steady state condition of said driver input is a percent increase in pedal position.

7. The method of claim 6, wherein said percent increase in pedal position is between about 1% and 99%.

8. A control system for controlling a continuously variable transmission and an engine, comprising
- a driver input having a steady state condition and a non-steady state condition;
- a supervisory control module, said supervisory control module being adapted to constrain the engine to a predetermined operating curve in response to said steady state condition of said driver input, and being adapted to relax the engine from said predetermined operating curve in response to said non-steady state condition of said driver input;
- cross coupling inputs being indicative of at least a portion of said steady state condition or said non-steady state condition;
- an engine controller, said engine controller being adapted to receive a desired wheel speed indicative of said driver input from said supervisory control module, being adapted to receive an actual wheel speed, being adapted to receive said cross coupling inputs, and being adapted to provide a desired engine throttle to the engine; and
- a transmission controller, said transmission controller being adapted to receive a desired transmission ratio indicative of said driver input from said supervisory control module, being adapted to receive an actual transmission ratio, being adapted to receive said cross coupling inputs, and being adapted to provide a desired CVT ratio change rate to the continuously variable transmission,
- said engine controller and said transmission controller being adapted to receive said cross coupling inputs simultaneously such that said desired engine throttle corresponds to said driver input and said desired CVT ratio change rate corresponds to said driver input.

9. The system of claim 8, wherein said non-steady state condition is a percent increase of an accelerator pedal position.

10. The system of claim 9, wherein said percent increase is between about 1% and about 99%.

11. The system of claim 8, wherein said engine controller and said transmission controller are a two-input, two-output control system.

12. The system of claim 8, wherein said engine controller and said transmission controller are a powertrain control module.

13. A method of eliminating a non-minimum phase zero effect from a CVT ratio change rate input to a wheel speed output of a continuously variable transmission coupled to an engine, comprising:
- constraining the engine to operate along a predetermined operating curve during a steady state condition;
- relaxing the engine from said predetermined operating curve during a non-steady state condition; and
- providing cross coupling inputs indicative of at least a portion of said non-steady state condition.

14. The method of claim 13, wherein said non-steady state condition is a percent increase of an accelerator pedal position.

15. The method of claim 13, wherein said predetermined operating curve is an engine maximum fuel efficiency curve.

16. A control system for a vehicle, comprising:
- a powertrain including an engine, a continuously variable transmission, and a two-input, two-output control module; and
- a supervisory control module, said supervisory control module being adapted to constrain said engine to an optimal engine operating curve in response to a first driver input, and being adapted to relax said engine from said optimal engine operating curve in response to a second driver input, said two-input, two-output control module having first and second cross coupling inputs being indicative of at least a portion of said second driver input;
- said two-input, two-output control module being adapted to receive a desired wheel speed and a desired transmission ratio indicative of said second driver input from said supervisory control module, being adapted to receive an actual wheel speed and an actual transmission ratio from the vehicle, and being adapted to receive said first and second cross coupling inputs, and in response said two-input, two-output control module provides a desired engine throttle to said engine and a desired CVT ratio change rate to said continuously variable transmission such that said desired engine throttle corresponds to said second driver input and said desired CVT ratio change rate corresponds to said second driver input.

17. The control system of claim 16, wherein one of said first and second cross coupling inputs is zero.

18. The control system of claim 16, wherein said two-input, two-output control module comprises an engine controller and a transmission controller.

* * * * *

UNITED STATES PATENT AND TRADEMARK OFFICE
CERTIFICATE OF CORRECTION

PATENT NO. : 6,579,206 B2
DATED : June 17, 2003
INVENTOR(S) : Sharon Liu et al.

It is certified that error appears in the above-identified patent and that said Letters Patent is hereby corrected as shown below:

Drawings,
Figure 3, a line has been added between elements $C_{22}$ and $C_{12}$.

Signed and Sealed this

Twentieth Day of July, 2004

JON W. DUDAS
*Acting Director of the United States Patent and Trademark Office*

FIG. 3

FIG. 4